US012089105B2

(12) United States Patent
Arora et al.

(10) Patent No.: US 12,089,105 B2
(45) Date of Patent: Sep. 10, 2024

(54) SYSTEMS AND METHODS OF FAIL-SAFE PACKET TRANSMISSION USING LONG RANGE WIDE AREA NETWORKS

(71) Applicant: Bank of America Corporation, Charlotte, NC (US)

(72) Inventors: Saurabh Arora, Gurugram (IN); Sandeep Kumar Chauhan, Miyapur Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 409 days.

(21) Appl. No.: 17/712,248

(22) Filed: Apr. 4, 2022

(65) Prior Publication Data

US 2023/0319664 A1 Oct. 5, 2023

(51) Int. Cl.
*H04W 36/30* (2009.01)
*H04W 4/30* (2018.01)
*H04W 12/08* (2021.01)
*H04W 24/04* (2009.01)
*H04W 24/08* (2009.01)
*H04W 28/04* (2009.01)
*H04W 28/06* (2009.01)
(Continued)

(52) U.S. Cl.
CPC ........... *H04W 36/30* (2013.01); *H04W 24/04* (2013.01); *H04W 24/08* (2013.01); *H04W 28/04* (2013.01); *H04W 28/06* (2013.01); *H04W 36/0022* (2013.01); *H04W 36/0069* (2018.08); *H04W 12/069* (2021.01)

(58) Field of Classification Search
None
See application file for complete search history.

(56) References Cited

U.S. PATENT DOCUMENTS 10,827,345 B1 11/2020 Tandon et al.
11,882,503 B1 * 1/2024 Xu ........................ H04W 4/029
(Continued)

OTHER PUBLICATIONS

"What is LoraWAN Specification?" LoRa Alliance, https://lora-alliance.org/about-lorawan/, Retrieved on Mar. 22, 2022.
(Continued)

*Primary Examiner* — Duc T Duong
(74) *Attorney, Agent, or Firm* — Weiss & Arons LLP

(57) ABSTRACT

A system architecture for running a second network to support a seamless transition of a transaction request in response to a detection of a connection failure at a first network is provided. The system architecture may include a mobile application running on a mobile device for transmitting the transaction request to the first network and attempting to establish an electronic connection with the first network. The system architecture may also include a LoRa sensor embedded on the mobile device configured to, when the attempt to establish the electronic connection with the first network fails, transmit the transaction request to the second network. The second network may be a low-range wide area network ("LoRaWAN"). The system architecture may also include a LoRaWAN gateway(s) configured to receive the transaction request and transmit the transaction request to a network server operating as a bridge between the LoRaWAN gateway(s) and an entity network.

20 Claims, 6 Drawing Sheets

(51) Int. Cl.
*H04W 36/00* (2009.01)
*H04W 12/069* (2021.01)

(56) References Cited

U.S. PATENT DOCUMENTS

| | | | |
|---|---|---|---|
| 12,034,804 B2* | 7/2024 | Gorilovsky | G06Q 40/12 |
| 2017/0197583 A1* | 7/2017 | Izraeli | H04W 4/80 |
| 2017/0344962 A1* | 11/2017 | Agrawal | H04L 65/1069 |
| 2019/0352124 A1* | 11/2019 | Pahlke | H04W 4/14 |
| 2022/0124153 A1* | 4/2022 | Kakinada | H04L 69/04 |
| 2022/0150798 A1* | 5/2022 | Stammers | H04W 64/003 |
| 2022/0159488 A1* | 5/2022 | Guibene | H04W 24/08 |
| 2023/0044362 A1* | 2/2023 | Ulen | H04L 9/0894 |

OTHER PUBLICATIONS

"LoRaWAN Architecture: LoRaWAN Application Areas," Telemetric, 2019.

* cited by examiner

SYSTEMS AND METHODS OF FAIL-SAFE PACKET TRANSMISSION USING LONG RANGE WIDE AREA NETWORKS

FIELD OF TECHNOLOGY

Aspects of the disclosure relate to digital transactions on digital networks. Specifically, aspects of the disclosure relate to transitioning digital transactions to an alternate network infrastructure when a network connection failure occurs.

BACKGROUND OF THE DISCLOSURE

Digital network infrastructure for enabling devices to connect to the internet are utilized all day and every day. Digital transactions are initiated, processed and completed using the digital network infrastructure. Digital transactions rely on cellular networks, wireless fidelity ("WiFi") networks and any other suitable networks to enable completing each transaction.

Very often a digital transaction fails due to a network connection related issue. Network connection failure may occur in certain remote locations. For example, network connection failure may occur while driving on highways that are in remote areas.

When a network connection fails while processing a transaction, the transaction does not get completed. In some events, the transaction fails, and the sender receives a notification of a failure. In other events, the transaction may get partially processed. The sender then has to contact the entity to file for a dispute on the transaction.

Each dispute received by the entity is resource consumptive, costly to handle and time consuming.

Therefore, it would be desirable to implement an alternate network infrastructure to complete a transaction when a network connection failure occurs.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
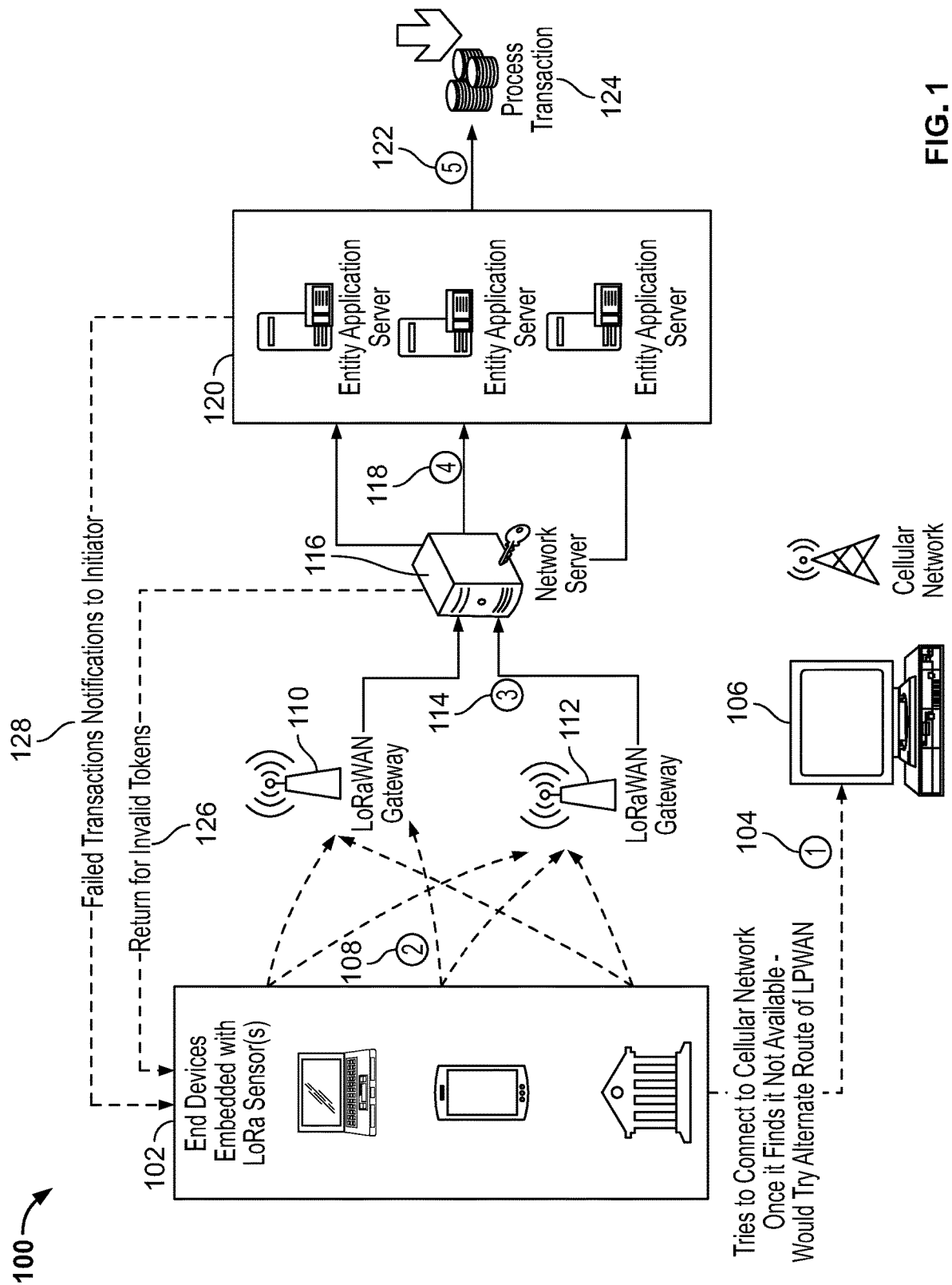
FIG. 1 shows an illustrative system architecture in accordance with principles of the disclosure.

A system architecture for running a second network in order to support a seamless transition of a transaction request is provided. The second network may be running in response to a detection of a connection failure at a first network.

The system architecture may include a mobile application running on a mobile device. The mobile application may be operable for transmitting the transaction request to the first network. The mobile application may be further operable for attempting to establish an electronic connection with the first network.

The first network may be a cellular network. The first network may be wireless fidelity ("WiFi"). The first network may be any other suitable network that may rely on spectrum bands of 2.4 Ghz.

When the attempt to establish the electronic connection with the first network fails, the mobile device may transmit the transaction request to the second network using a LoRa sensor embedded in the mobile device. A mobile device, for the purposes of this disclosure, may include a smartphone, laptop, tablet, iPhone, iPad or any other suitable computing device. The LoRa sensor may be embedded in any one or more of these aforementioned devices. The LoRa sensor may enable a mobile device to connect to the second network.

When the attempt to establish the electronic connection with the first network fails, this may indicate that the first network is not available.

In some embodiments, when the attempt fails, the system architecture may further assess a window of time immediately preceding the failure to determine whether the first network failed to respond to more than a pre-determined threshold percentage of ping requests within the window of time.

When the first network failed to respond to more than the pre-determined threshold percentage, the transaction request may automatically be transmitted to the second network.

The pre-determined threshold percentage of ping requests may be 90% of ping requests that failed to receive a response within the previous window of time. The window of time may be five seconds. The window of time may be a range between five and ten seconds. The window of time may be less than five seconds.

In some embodiments, a failure may occur mid-way of processing the transaction request. The system may fail to maintain a first network connection. In response to the failure, the transaction request may be transmitted to the second network to complete the transaction request.

It should be appreciated that the transmitting mid-way maybe a dynamic transmitting thereby enabling maintaining a continuous processing of the transaction request initiated at the first network and continued at the second network.

For example, the mobile application may successfully establish a connection to the first network. A user of the mobile application may be enabled to enter the data for the request but upon submission, may receive a 'fail.' In this example, the system may be enabled to transfer all required data for processing to the second network. The second network may be enabled to complete the transaction without any downtime and without a failure occurring.

The second network may be a low-range wide area network ("LoRaWAN"). LoRaWAN may be available when the first network is not available. LoRaWAN may be available in remote locations when commonly used networks, such as WiFi, Cellular networks, etc. are not always available. LoRaWAN is a type of low-power wide-area network ("LPWAN"). LPWAN networks are wireless and may have a wide coverage radius. It is an energy efficient network.

Data transferred on the LoRaWAN network may be transferred in bytes therefore when a transaction request is transmitted from a first network to the second network, data packets that may pass through a first network may not pass through the second network. In this example, the system may reduce the data packet size by splitting the first data packet and the second data packet each into two or more smaller data packets. Each data packet split from the first data packet may include a first identical message header and each data packet split from the second data packet may include a second identical message header.

The second network may include a first LoRaWAN gateway and a second LoRaWAN gateway. The first LoRaWAN gateway and the second LoRaWAN gateway may be configured to receive the transaction request. The first LoRaWAN gateway and the second LoRaWAN gateway may each be located within a pre-determined proximity to the mobile device.

It should be appreciated that the second network may include one, two, three, or more gateways within the pre-determined proximity. When a transaction is transmitted to the second network, because of the close proximity of the gateways, more than one gateway may receive the same data packet. Each data packet at each gateway may be transmitted to the network server. The network server may be enabled to identify the duplicate data packets and eliminate the duplicates.

The second network may also include a network server. The network server may be configured to receive a first data packet including the transaction request from the first LoRaWAN gateway. The network server may also be configured to receive a second data packet including the transaction request from the second LoRaWAN gateway. The network server may operate as a bridge between the first LoRaWAN gateway and the second LoRaWAN gateway and an entity network.

When the network server receives the first data packet, the network server may be triggered to start a timer for potentially receiving duplicate data packets. The timer may start upon receipt of the first data packet and may stop after a pre-determined time period. The pre-determined time period may be four seconds.

The network server may also include a gateway cache hosted on the network server. The network server, upon receipt of the first data packet, may store first transaction data associated with the first data packet at the gateway cache. Transaction data may include an initiating account number, an authorization key, a destination account number and a transaction amount.

The network server may be further configured to, in response to a determination that the first transaction data is not identical to transaction data already saved at the gateway cache, store the transaction request in a queue.

The gateway cache, upon receipt of the second data packet, may be configured to store second transaction data associated with the second data packet.

The network server may be further configured to, in response to a determination that the second transaction data is identical to the first transaction data, delete the second data packet.

Upon the lapse of the pre-determined time period, the network server may be configured to validate all transaction requests included in data packets stored in the queue.

The validating for each transaction request may include confirming that the initiating account number is a legitimate account number. The validating may further include confirming that the authorization key is a valid key. The validating may further include confirming that the destination account number is a legitimate account number. The validating may further include confirming that the transaction amount is an acceptable value.

The network server may be configured to remove from the queue all data packets which fail to validate. In response to a failure to validate a transaction request, the network server may be configured to transmit the transaction request back to a sender identified in a header of a data packet. The data packet being the data packet including the transaction request that failed to validate.

After the removal, the network server may be configured to transmit the transaction requests stored in the queue to an entity application server associated with the entity network.

The entity application server may receive the transaction requests for processing. Transaction data for each transaction request may require authorization.

The entity application server may authorize the first data packet. The authorizing for the first data packet may include verifying that an authentication ID included in the first data packet is the authentication ID of the sender and associated with the initiating account number. The authorizing may further include confirming that the authorization key is a valid authorization key. The authorizing may also include determining that an initiating account has a value equal to at least the transaction amount.

When the first data packet is not authorized the entity application server may return the transaction request including the first data packet to the sender.

In some embodiments, when the first data packet is not authorized the entity application server may be configured to transmit an alert of a failure to the sender.

In response to the authorizing, the entity application server may complete the transaction request included in the first data packet. The entity application server may further complete each transaction request that may be included in additional data packets received.

It should be appreciated that in some embodiments the queue may include validated transaction requests received prior to the first data packet and the transaction request included in the first data packet. In some embodiments, the queue may only include the transaction request included in the first data packet.

A method for supporting a seamless transition of a transaction request from a first network to a second network in response to a detection of a first network connection failure is provided.

The method may include, using a mobile application running on a mobile device, to transmit the transaction request to the first network for being routed to an entity application server. The transaction request may include a data packet. The data packet may include transaction request data.

The method may include failing to establish an electronic connection with the first network. In some embodiments, the method may include failing to maintain an already established electronic connection with the first network.

The method may further include, immediately in response to the failure to establish the electronic connection with the first network, using the mobile device to transmit the transaction request to the second network. The transmission may be enabled using a LoRa sensor embedded in the mobile device. The second network may be a LoRaWAN.

The method may include receiving the transaction request at a first LoRaWAN gateway and at a second LoRaWAN gateway. The first LoRaWAN gateway and the second LoRaWAN gateway may be associated with the second network. The first LoRaWAN gateway and the second LoRaWAN gateway may each be within a pre-determined proximity to the mobile device.

The method may further include receiving, at a network server, a first data packet including the transaction request from the first LoRaWAN gateway. The method may also include receiving, at the network server, a second data packet including the transaction request from the second LoRaWAN gateway. The network server may operate as the bridge between the first LoRaWAN gateway and the second LoRaWAN gateway and an entity network.

The method may further include, upon receipt of the first data packet, storing in a gateway cache first transaction data associated with the first data packet.

In response to a determination, by the network server, that the first transaction data is not identical to transaction data already saved at the gateway cache, the method may include storing the transaction request in a queue.

The method may further include, upon receipt of the second data packet, storing in the gateway cache second transaction data associated with the second data packet.

In response to a determination, by the network server, that the second transaction data is identical to the first transaction data, the method may include deleting the second data packet.

The method may further include, upon a lapse of a pre-determined time period, validating all transaction requests included in data packets stored in the queue.

When the gateway cache stores the first transaction data, the network server may be configured to trigger a start of a timer for determining identical data packets identical to the first data packet and upon the lapse of the pre-determined time period, the network server may be configured to trigger a stop of the timer. Within that time period the network server may assume to receive all duplicate data packets and transfer the unique data packet(s) for processing at the entity network.

When a data packet is received at the network server following the pre-determined time period, the network server may determine based on the header in the data packet whether the data packet is a new transaction request or a duplicate of a previously received data packet. When the header includes identical data as a previously received data packet, the network server may automatically delete the data packet. When the header does not include identical data as a previously received data packet, the network server may further analyze the data packet as a potentially new data packet for a new transaction request.

The pre-determined time period may be equal to about four seconds. The pre-determined time period may be four seconds. The pre-determined time period may be lower than four seconds. The pre-determined time period may be five seconds.

After the pre-determined time period mentioned above has elapsed from receipt of the first data packet, a lower level of similarity may be used for determining whether a data packet is identical to the first data packet. The network server may determine whether the additional data packet has a similar high-level data signature that corresponds to the first data packet. When the additional data packet has a similar high-level data signature corresponding to the first data packet, the network server may be configured to delete the additional data packet.

In some embodiments, similar high-level data signature may include one or more segments of data that may indicate a similarity to the first data packet. This may include a first or last name of the sender of the data packet. This may include an identical account number, similar message header, etc.

The method may further include, removing from the queue all data packets failing to validate. In response to a failure to validate a transaction request, the method may include transmitting the transaction request back to a sender identified in a header of a data packet including the transaction request.

After the removing, the method may include transmitting the transaction requests stored in the queue to the entity application server associated with the entity network.

In some embodiments, when the transaction request is transmitted to the second network, the method may include reducing the data packet size for transmission on the LoRaWAN. The reducing of the data packet size may include splitting the first data packet and the second data packet each into two or more smaller data packets. Each data packet split from the first data packet may include a first identical message header. Each data packet split from the second data packet may include a second identical message header.

When the data packets reach the network server, the network server may be enabled to identify a match of data packets based on identical message headers and combine the split data packets back into one single packet.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative system architecture 100 which enables alternating networks when processing transaction requests.

End devices 102 may be computing devices including, but not limited to, a mobile device, a laptop, a smartphone, a tablet, a work station within a banking center, or any other suitable device.

Each of end devices 102 may be embedded with one or more LoRa sensors. These LoRa sensors may enable end devices 102 to initiate communications with an alternate network i.e.—LoRaWAN, when cellular network 106 is not available.

At 104, an end device 102 attempts to connect to cellular network 106. When cellular network 106 is not available, system architecture 100 enables an automatic switch, as shown at 108, to connect to the LoRaWAN.

LoRaWAN may include LoRaWAN gateway 110 and LoRaWAN gateway 112. Each of gateways 110 and 112 may be configured to receive data from end devices 102 and transmit data to a LoRaWAN network server 116. Network server 116 may manage and maintain the LoRa network.

Because of the close proximity of LoRaWAN gateways, more than one gateway may receive the same data transmitted from an end device 102. When a data packet is received at LoRaWAN gateway 110 and/or 112, the data packet(s) may be transmitted, as shown at 114, to network server 116.

Network server 116 may manage the data and eliminate duplicate data received from end device 102.

Each data packet received at network server 116 may be validated. When the data packet is not valid, network server 116 may transmit the data packet back to the sender of the transaction request, as shown at 126. The data packet may be returned including the invalid token.

Each data packet received at network server 116 may be determined whether it is a unique transaction request included in the data packet or whether it is a duplicate to a previously received data packet. Network server 116 may be enabled to eliminate the duplicate data packets and transmit only a unique request, as shown at 118, to the entity application server 120.

Entity application server 120 may be configured to authorize each data packet, process each data packet, as shown at 122, and complete the transaction request included in each data packet, as shown at 124.

When entity application server 120 determines that a data packet is not authorized, entity application server 120 may cause the transaction to fail and send a notification to the initiator of the transaction request, as shown at 128.

Figure 2:
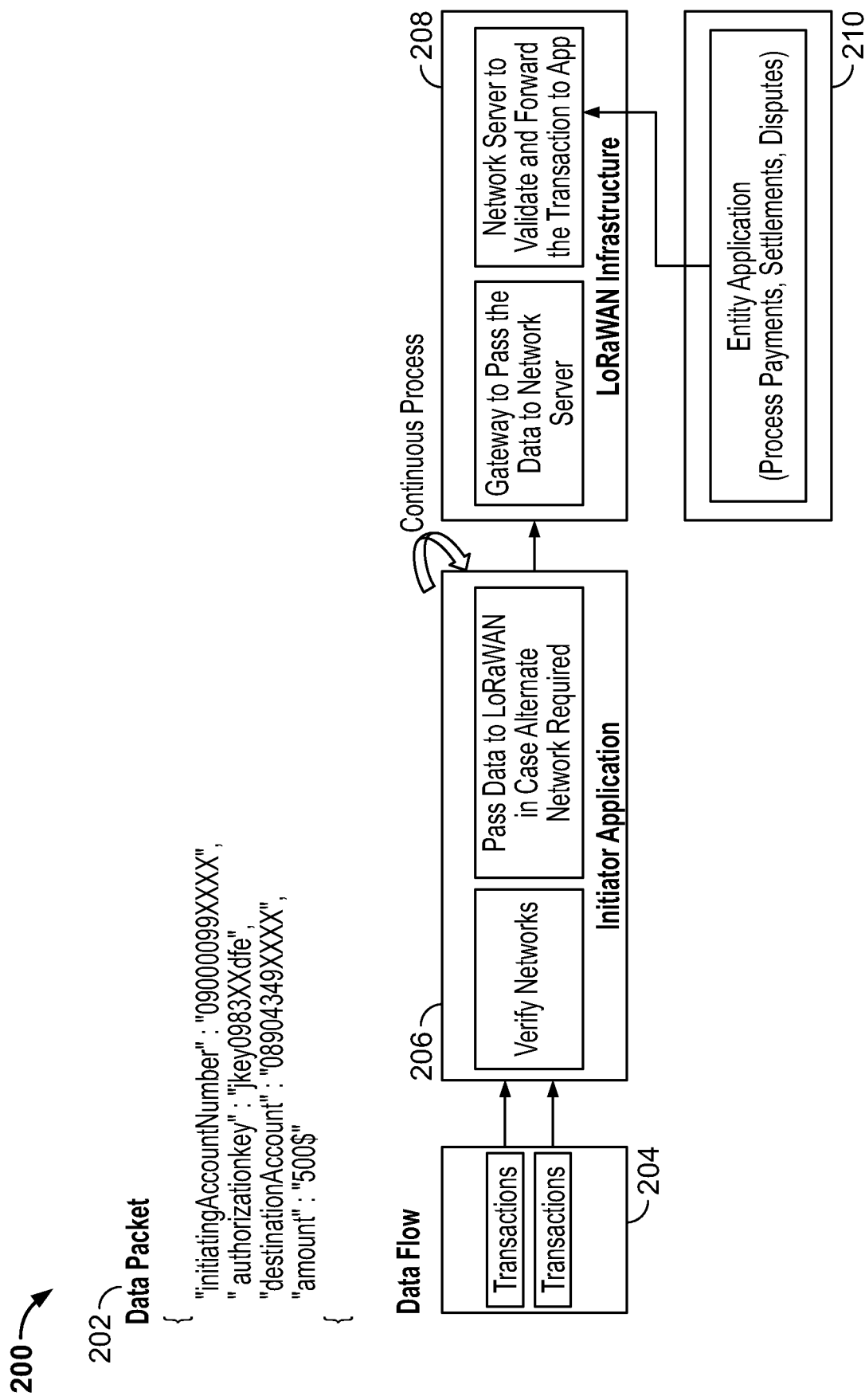
FIG. 2 shows an illustrative diagram in accordance with principles of the disclosure.

FIG. 2 shows an illustrative flow diagram 200 of the data flow for transaction requests in accordance with principles of the disclosure.

At 204, transaction requests are initiated. The transaction requests may be initiated on a mobile application on a user's mobile device, laptop or at a work station within a banking center associated with the entity.

Each transaction request may be included within a data packet. Each data packet, as shown at 202, may include an initiating account number, an authorization key, a destination account number and an amount.

The transaction requests may be transmitted to an initiator application 206. Initiator application 206 may verify network strength. Initiator application 206 may determine whether the first network is available. The first network may be a cellular network. The first network may be a WiFi network. When the first network is not available, the initiator application may transmit the transaction requests to an alternate network. The alternate network may be the LoRaWAN.

In some embodiments, the network may be available but the signal strength may be significantly low. The system may transmit a ping request to the first network. The transmission of ping requests may be a continuous process. The system may continuously transmit ping requests to the first network for determining network availability.

In some embodiments the ping request may time out. In some embodiments the ping request may hang and the system may not receive a response. The system may check ping responses periodically. When 90% of the last few ping requests failed, the initiator application may automatically reroute the transaction request to the alternate network to avoid a failure in the processing of the transaction.

In some embodiments, the ping request may receive a response immediately and the first network may be available for processing. In this embodiment, the transaction request may be transmitted to the first network for processing and completion.

LoRaWAN infrastructure may be shown at 208. LoRaWAN infrastructure 208 may include one or more LoRaWAN gateways and a network server associated with the LoRaWAN. The LoRaWAN gateway(s) may be configured to pass data to the network server. The network server may be configured to validate and forward the transaction to the entity application server.

Entity application 210 may be executed on an entity application server. Entity application 210 may receive the transaction requests, authorize the transaction requests and process the transactions.

Figure 3A:
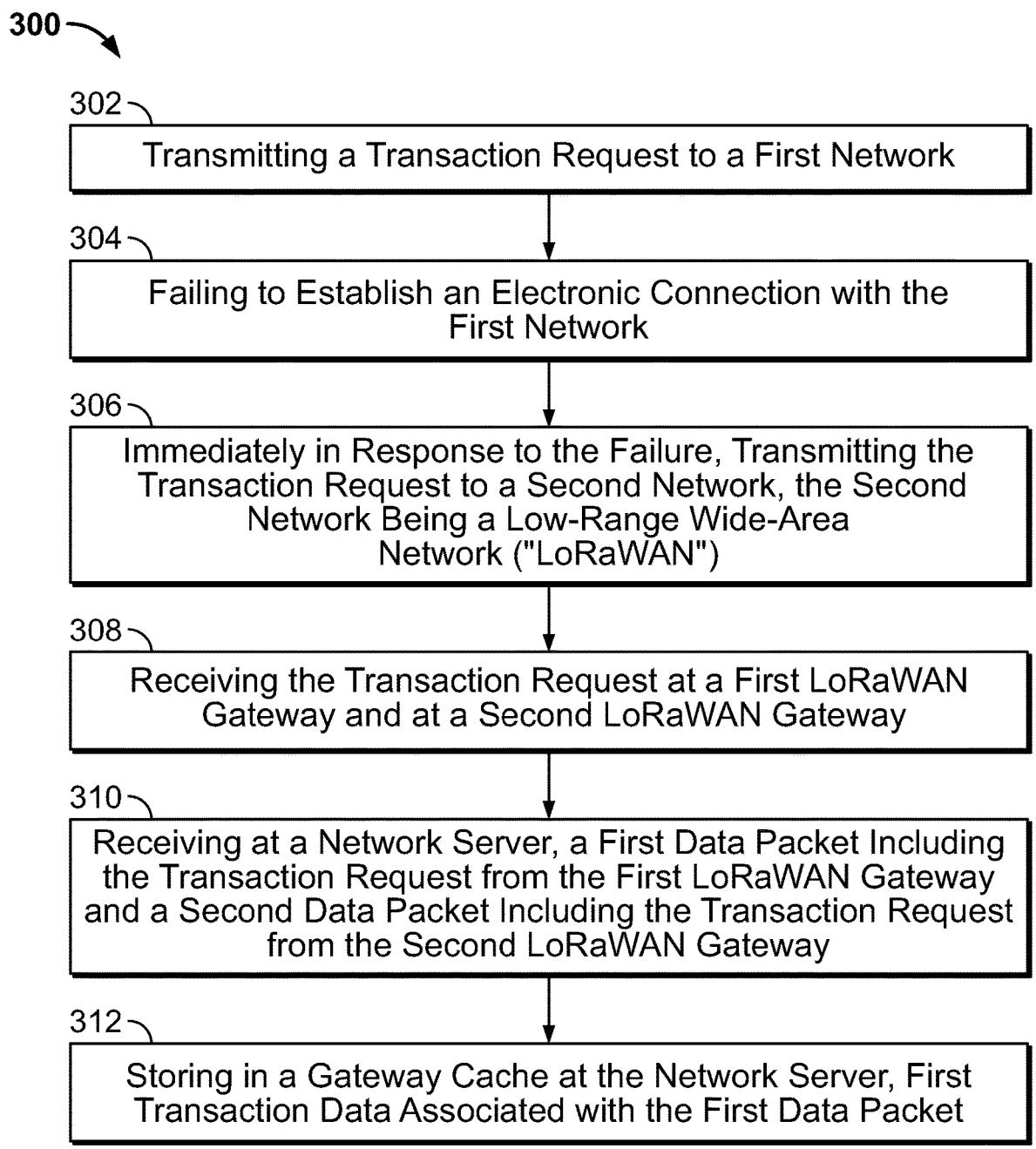
FIG. 3A shows an illustrative flow chart in accordance with principles of the disclosure.
Figure 3B:
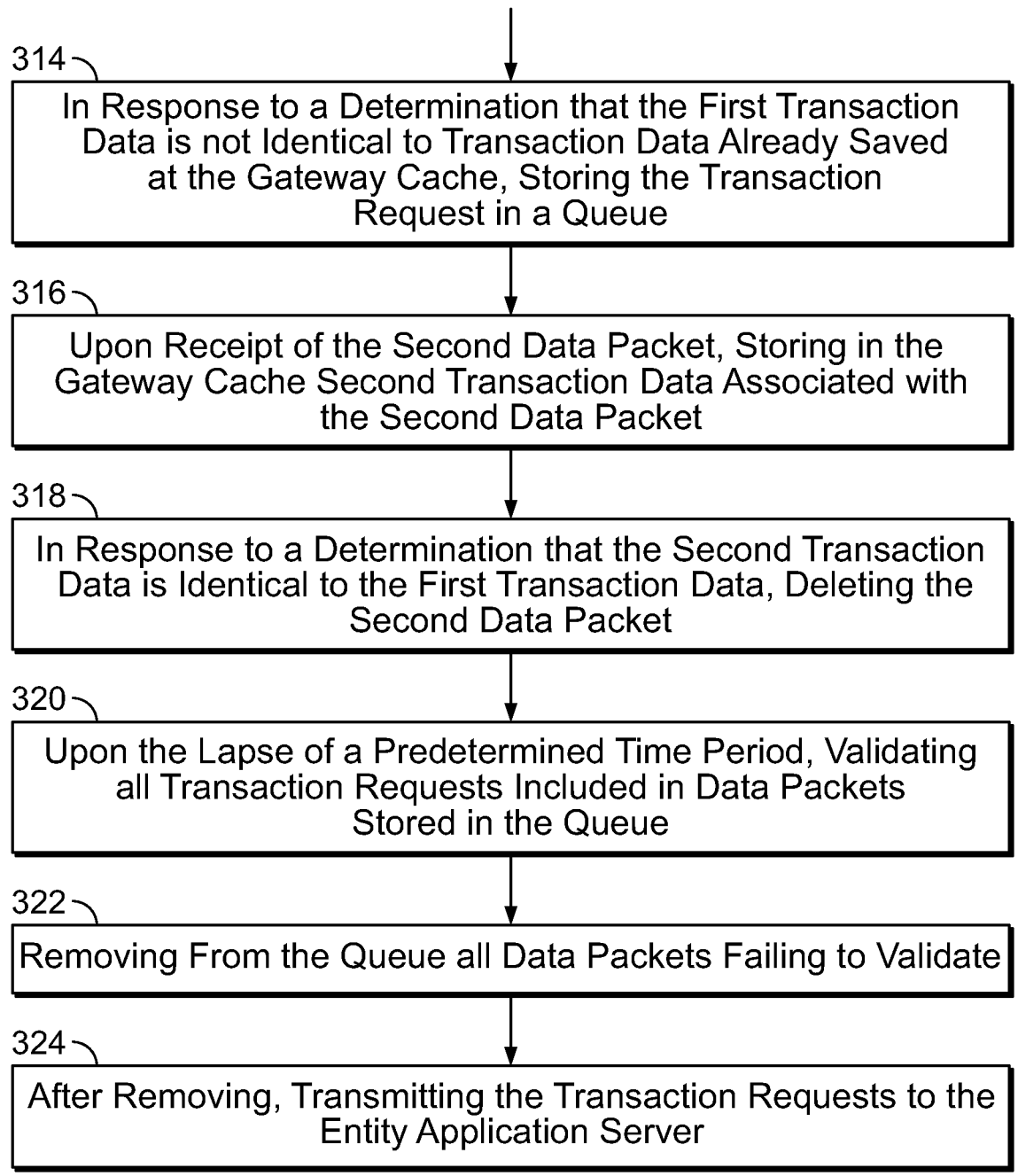
FIG. 3B shows an illustrative flow chart in accordance with principles of the disclosure.

FIGS. 3A and 3B show an illustrative flow chart 300 in accordance with principles of the disclosure. The illustrative method shown in the flow chart include steps 302-312 included in FIG. 3A and steps 314-324 included in FIG. 3B.

At step 302, a transaction request may be transmitted to a first network. The transaction request may be transmitted from a mobile application running on a user's mobile device. The mobile application may attempt to initiate a connection with the first network. In some embodiments the connection may be available and the transaction request may be transmitted via the first network.

At step 304, the connection may fail. The method may include failing to establish an electronic connection with the first network.

At step 306, in response to the failure, the method step may include transmitting the transaction request to a second network. The second network being the LoRaWAN.

At step 308, the method step may include receiving the transaction request at a first LoRaWAN gateway and at a second LoRaWAN gateway.

The first LoRaWAN gateway and the second LoRaWAN gateway may each transmit the transaction request to the network server.

At step 310, the method step may include, receiving at the network server, a first data packet including the transaction request from the first LoRaWAN gateway and further receiving a second data packet including the transaction request from the second LoRaWAN gateway.

At step 312, the method step may include, storing in a gateway cache at the network server, first transaction data associated with the first data packet.

FIG. 3B shows a continuation of the illustrative flow chart in accordance with principles of the disclosure. FIG. 3B includes the method steps 314-324 of the illustrative method.

At step 314, in response to a determination that the first transaction data is not identical to transaction data already saved at the gateway cache, the method step may include storing the transaction request in a queue.

Upon receipt of the second data packet, as shown at step 316, the method step may include storing in the gateway cache second transaction data associated with the second data packet.

At step 318, in response to a determination that the second transaction data is identical to the first transaction data, the method step may include deleting the second data packet.

At step 320, upon the lapse of a pre-determined time period, the method step may include validating all transaction requests included in data packets stored in the queue.

At step 322, the method step may include, removing from the queue all data packets which fail to validate.

At step 324, after removing, the method step may include transmitting the transaction requests to the entity application server.

Figure 4:
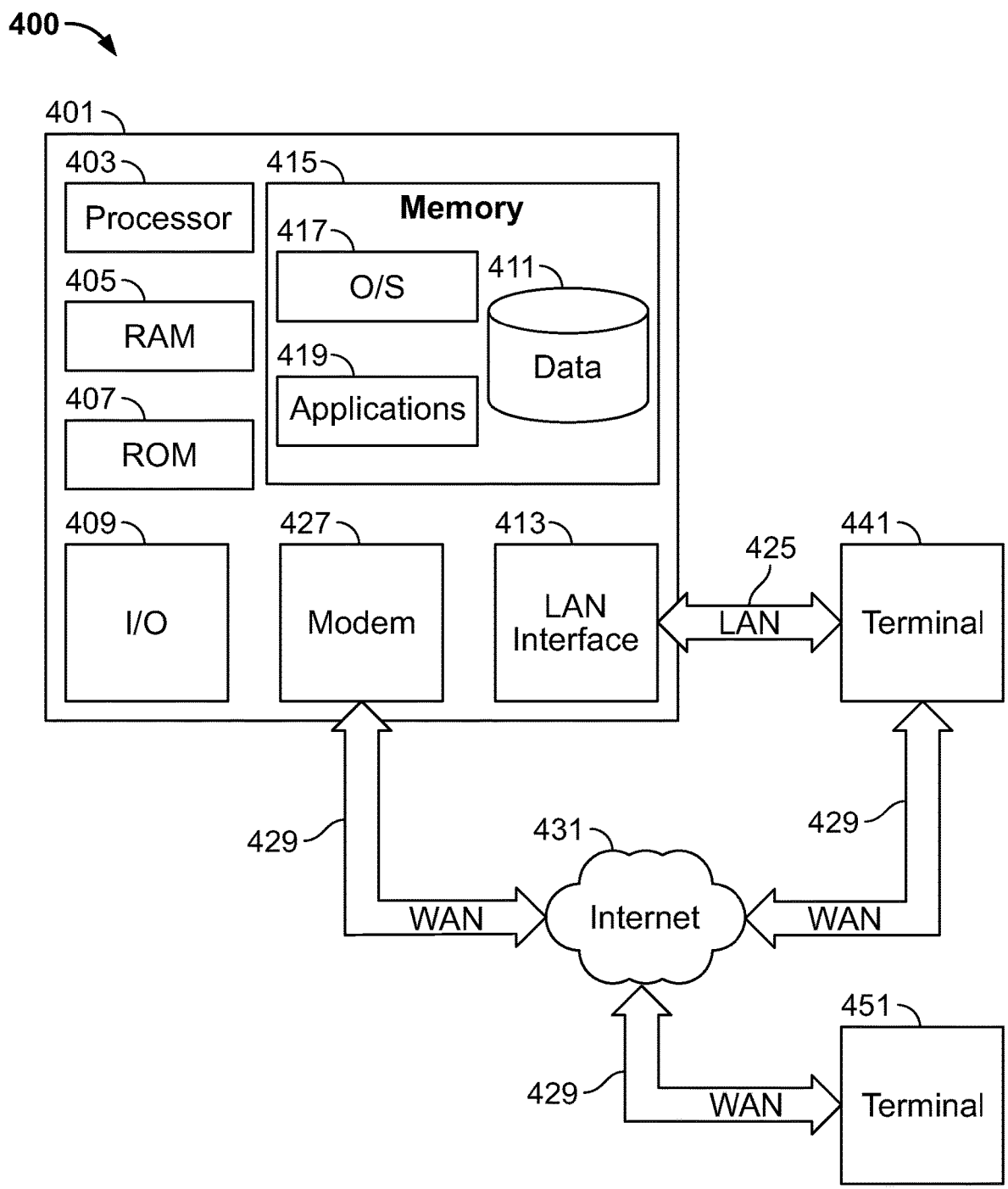
FIG. 4 shows an illustrative block diagram of apparatus in accordance with the invention.

FIG. 4 shows an illustrative block diagram of system 400 that includes computer 401. Computer 401 may alternatively be referred to herein as an "engine," "server" or a "computing device." Computer 401 may be a workstation, desktop, laptop, tablet, smart phone, or any other suitable computing device. Computer 401 may be end device 102. Elements of system 400, including computer 401, may be used to implement various aspects of the systems and methods disclosed herein. Specifically, one or more of end devices 102, cellular network 106, LoRaWAN gateway 110 and 112, network server 116, entity application server(s) 120, initiator application 206, LoRaWAN infrastructure 208 and entity application 210, may include some or all of the elements and apparatus of system 400. Furthermore, each of the method steps illustrated in FIG. 3, may be performed using one or more of the elements and apparatus of system 400.

Computer 401 may have a processor 403 for controlling the operation of the device and its associated components, and may include RAM 405, ROM 407, input/output circuit 409, and a non-transitory or non-volatile memory 415. Machine-readable memory may be configured to store information in machine-readable data structures. The processor 403 may also execute all software running on the computer—e.g., the operating system and/or voice recognition software. Other components commonly used for computers, such as EEPROM or Flash memory or any other suitable components, may also be part of the computer 401.

The memory 415 may be comprised of any suitable permanent storage technology—e.g., a hard drive. The memory 415 may store software including the operating system 417 and application(s) 419 along with any data 411 needed for the operation of computer 401. Memory 415 may also store videos, text, and/or audio assistance files. The data stored in Memory 415 may also be stored in cache memory, or any other suitable memory.

Input/output ("I/O") module 409 may include connectivity to a microphone, keyboard, touch screen, mouse, and/or stylus through which input may be provided into computer 401. The input may include input relating to cursor movement. The input/output module may also include one or more speakers for providing audio output and a video display device for providing textual, audio, audiovisual, and/or graphical output. The input and output may be related to computer application functionality.

Computer 401 may be connected to other systems via a local area network (LAN) interface 413. Computer 401 may operate in a networked environment supporting connections to one or more remote computers, such as terminals 441 and 451. Terminals 441 and 451 may be personal computers or servers that include many or all of the elements described above relative to computer 401. The network connections depicted in FIG. 4 include a local area network (LAN) 425 and a wide area network (WAN) 429 but may also include other networks. When used in a LAN networking environment, computer 401 is connected to LAN 425 through a LAN interface 413 or an adapter. When used in a WAN networking environment, computer 401 may include a modem 427 or other means for establishing communications over WAN 429, such as Internet 431.

Exemplary terminals 441 and/or 451 may be one or more of entity application server 120. A connection between Computer 401 and Terminals 451 and/or 441 may established via one or more of the LoRaWAN gateways 110 and/or 112 as described herein.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 419, which may be used by computer 401, may include computer executable instructions for invoking functionality related to communication, such as e-mail, Short Message Service (SMS), and voice input and speech recognition applications. Application program(s) 419 (which may be alternatively referred to herein as "plugins," "applications," or "apps") may include computer executable instructions for invoking functionality related to performing various tasks. Application programs 419 may utilize one or more algorithms that process received executable instructions, perform power management routines or other suitable tasks. Application programs 419 may utilize one or more decisioning processes for determining when to reroute a transaction request from a first network to a second network.

Application program(s) 419 may include computer executable instructions (alternatively referred to as "programs"). The computer executable instructions may be embodied in hardware or firmware (not shown). The computer 401 may execute the instructions embodied by the application program(s) 419 to perform various functions.

Application program(s) 419 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 411, and any other suitable information, may be stored in memory 415. One or more of applications 419 may include one or more algorithms that may be used to implement features of the disclosure including the triggering for switching transaction requests from a first network to a second network.

The invention may be described in the context of computer-executable instructions, such as applications 419, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 401 and/or terminals 441 and 451 may also include various other components, such as a battery, speaker, and/or antennas (not shown). Components of computer system 401 may be linked by a system bus, wirelessly or by other suitable interconnections. Components of computer system 401 may be present on one or more circuit boards. In some embodiments, the components may be integrated into a single chip. The chip may be silicon-based.

Terminal 451 and/or terminal 441 may be portable devices such as a laptop, cell phone, Blackberry™, tablet, smartphone, or any other computing system for receiving, storing, transmitting and/or displaying relevant information. Terminal 451 and/or terminal 441 may be one or more user devices. Terminals 451 and 441 may be identical to computer 401 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 5:
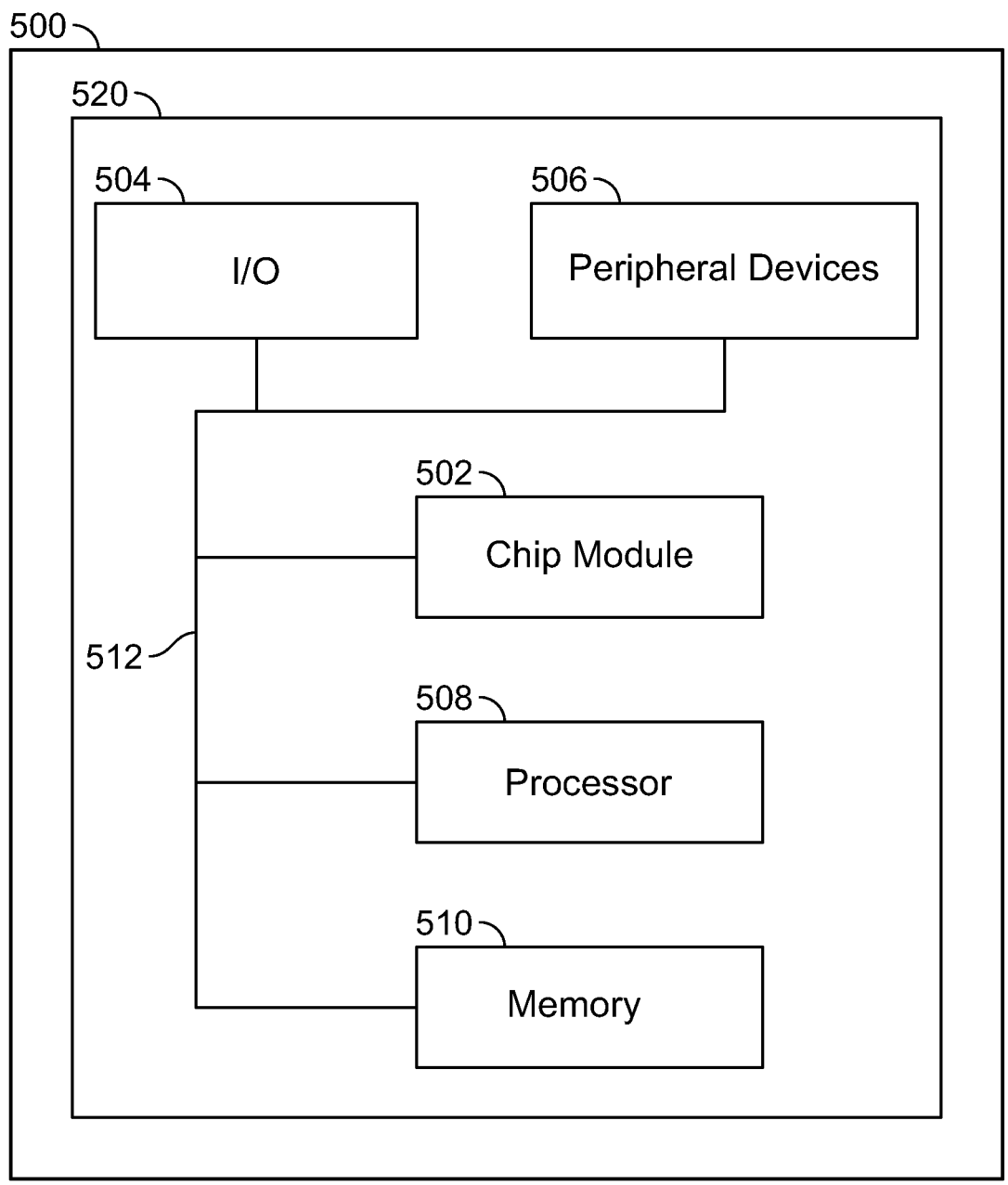
FIG. 5 shows an illustrative apparatus that may be configured in accordance with the invention.

FIG. 5 shows illustrative apparatus 500 that may be configured in accordance with the principles of the disclosure. Apparatus 500 may be a computing device. Apparatus 500 may include one or more features of the apparatus shown in FIG. 4. Apparatus 500 may include chip module 502, which may include one or more integrated circuits, and which may include logic configured to perform any other suitable logical operations.

Apparatus 500 may include one or more of the following components: I/O circuitry 504, which may include a transmitter device and a receiver device and may interface with fiber optic cable, coaxial cable, telephone lines, wireless devices, PHY layer hardware, a keypad/display control device or any other suitable media or devices; peripheral devices 506, which may include counter timers, real-time timers, power-on reset generators or any other suitable peripheral devices; logical processing device 508, which may compute data structural information and structural parameters of the data; and machine-readable memory 510.

Machine-readable memory 510 may be configured to store in machine-readable data structures: machine executable instructions, (which may be alternatively referred to herein as "computer instructions" or "computer code"), applications such as applications 519, signals, and/or any other suitable information or data structures.

Components 502, 504, 506, 508 and 510 may be coupled together by a system bus or other interconnections 512 and may be present on one or more circuit boards such as circuit board 520. In some embodiments, the components may be integrated into a single chip. The chip may be silicon-based.

Thus, systems and methods for supporting a seamless transition of a transaction request from a first network to a second network in response to a detection of a first network connection failure is provided. Persons skilled in the art will appreciate that the present invention can be practiced by other than the described embodiments, which are presented for purposes of illustration rather than of limitation.

What is claimed is:

1. A method for supporting a seamless transition of a transaction request from a first network to a second network in response to a detection of a first network connection failure, the method comprising:

using a mobile application running on a mobile device, transmitting the transaction request to the first network for being routed to an entity application server, the transaction request including a data packet comprising transaction request data;

failing to establish an electronic connection with the first network;

immediately in response to the failure to establish the electronic connection with the first network, using the mobile device to transmit the transaction request to the second network using a LoRa sensor embedded in the mobile device, the second network being a low-range wide area network ("LoRaWAN");

receiving the transaction request at a first LoRaWAN gateway and at a second LoRaWAN gateway, the first LoRaWAN gateway and the second LoRaWAN gateway being associated with the second network, the first LoRaWAN gateway and the second LoRaWAN gateway each being within a pre-determined proximity to the mobile device;

receiving, at a network server, a first data packet including the transaction request from the first LoRaWAN gateway and a second data packet including the transaction request from the second LoRaWAN gateway, the network server bridging between the first LoRaWAN gateway and the second LoRaWAN gateway and an entity network;

upon receipt of the first data packet, storing in a gateway cache first transaction data associated with the first data packet;

in response to a determination, by the network server, that the first transaction data is not identical to transaction data already saved at the gateway cache, storing the transaction request in a queue;

upon receipt of the second data packet, storing in the gateway cache second transaction data associated with the second data packet;

in response to a determination, by the network server, that the second transaction data is identical to the first transaction data, deleting the second data packet;

upon a lapse of a pre-determined time period, validating all transaction requests included in data packets stored in the queue;

removing from the queue all data packets failing to validate and, in response to a failure to validate a transaction request, transmitting the transaction request back to a sender identified in a header of a data packet including the transaction request; and after the removing, transmitting the transaction requests stored in the queue to the entity application server associated with the entity network.

2. The method of claim 1 wherein the failing comprises determining that the first network is unavailable.

3. The method of claim 2 wherein the determining further comprises assessing a window of time immediately preceding the failing to determine whether the first network failed to respond to more than a pre-determined threshold percentage of ping requests within the window of time.

4. The method of claim 1 wherein the transaction request data comprises an initiating account number, an authorization key, a destination account number and a transaction amount.

5. The method of claim 4 wherein the validating all transaction requests comprises confirming that for each transaction request:
the initiating account number is a legitimate account number;
the authorization key is a valid key;
the destination account number is a legitimate account number; and
the transaction amount is an acceptable value.

6. The method of claim 5 wherein when the first data packet is not authorized, the method comprises transmitting an alert of a failure to a sender of the transaction request from the first data packet.

7. The method of claim 5 wherein, when the first data packet is not authorized the method comprises returning the transaction request comprising the first data packet to the sender.

8. The method of claim 4 further comprising authorizing, by the entity application server, the first data packet, the authorizing comprising:
verifying that an authentication ID included in the first data packet is the authentication ID of the sender and associated with the initiating account number;
confirming that the authorization key is a valid authorization key; and
determining that an initiating account has a value equal to at least the transaction amount.

9. The method of claim 8 wherein, in response to the authorizing, completing the transaction request.

10. The method of claim 1 further comprising, when the first network is available, transmitting the transaction request to a first network gateway to execute the transaction request.

11. The method of claim 10 further comprising, upon execution of the transaction request, failing to maintain a first network connection and in response to the failure transmitting the transaction request to the second network to complete the transaction request.

12. The method of claim 1 wherein the first network is a cellular network or a wireless fidelity ("WiFi") network.

13. The method of claim 1 wherein the transmitting of the transaction request to the second network is a dynamic transmitting thereby enabling maintaining a continuous processing of the transaction request initiated at the first network and continued at the second network.

14. The method of claim 1 wherein, when the transaction request is transmitted to the second network, the method comprises reducing the data packet size by splitting the first data packet and the second data packet each into two or more smaller data packets, wherein each data packet split from the first data packet comprises an identical message header and each data packet split from the second data packet comprises an identical message header.

15. A system architecture for running a second network to support a seamless transition of a transaction request in response to a detection of a connection failure at a first network, the system architecture comprising:
a mobile application running on a mobile device for:
transmitting the transaction request to the first network; and
attempting to establish an electronic connection with the first network;
a LoRa sensor embedded on the mobile device, the LoRa sensor configured to, when the attempt to establish the electronic connection with the first network fails, transmit the transaction request to the second network, the second network being a low-range wide area network ("LoRaWAN");
a first LoRaWAN gateway and a second LoRaWAN gateway configured to receive the transaction request, the first LoRaWAN gateway and the second LoRaWAN gateway each located within a pre-determined proximity to the mobile device;
a network server configured to receive a first data packet including the transaction request from the first LoRaWAN gateway and a second data packet including the transaction request from the second LoRaWAN gateway, the network server operating as a bridge between the first LoRaWAN gateway and the second LoRaWAN gateway and an entity network;
a gateway cache hosted on the network server configured to, upon receipt of the first data packet, store first transaction data associated with the first data packet;
the network server further configured to, in response to a determination that the first transaction data is not identical to transaction data already saved at the gateway cache, store the transaction request in a queue;
the gateway cache, upon receipt of the second data packet, is configured to store second transaction data associated with the second data packet; and
the network server configured to, in response to a determination that the second transaction data is identical to the first transaction data, delete the second data packet and, upon lapse of a pre-determined time period:
validate all transaction requests included in data packets stored in the queue;
remove from the queue all data packets which fail to validate, and in response to a failure to validate a transaction request, transmit the transaction request back to a sender identified in a header of a data packet including the transaction request; and
after the removal, transmit the transaction requests stored in the queue to an entity application server associated with the entity network.

16. The system architecture of claim 15 wherein when the gateway cache stores the first transaction data, the network server is configured to trigger a start of a timer for determining identical data packets identical to the first data packet and upon the lapse of the pre-determined time period, the network server is configured to trigger a stop of the timer.

17. The system architecture of claim 16 wherein the pre-determined time period is a time period equal to about four seconds.

18. The system architecture of claim 16 wherein following the pre-determined time period, the network server is configured to, when an additional data packet is received from the first LoRaWAN gateway or the second LoRaWAN gateway, determine whether the additional data packet has a similar high-level data signature that corresponds to the first data packet.

19. The system architecture of claim 18 wherein when the additional data packet has a similar high-level data signature corresponding to the first data packet, the network server is configured to delete the additional data packet.

20. A method for supporting a seamless transition of a transaction request from a first network to a second network in response to a detection of a first network connection failure, the method comprising:

using a mobile application running on a mobile device, transmitting the transaction request to the first network for being routed to an entity application server, the transaction request including a data packet comprising transaction request data;

establishing an electronic connection with the first network;

receiving the transaction request at the first network;

failing to maintain the established electronic connection with the first network;

immediately in response to a detection of the failure to maintain the electronic connection with the first network, using the mobile device to transmit the transaction request to the second network using a LoRa sensor embedded in the mobile device, the second network being a low-range wide area network ("LoRaWAN");

receiving the transaction request at a first LoRaWAN gateway and at a second LoRaWAN gateway, the first LoRaWAN gateway and the second LoRaWAN gateway being associated with the second network, the first LoRaWAN gateway and the second LoRaWAN gateway each being within a pre-determined proximity to the mobile device;

receiving, at a network server, a first data packet including the transaction request from the first LoRaWAN gateway and a second data packet including the transaction request from the second LoRaWAN gateway, the network server bridging between the first LoRaWAN gateway and the second LoRaWAN gateway and an entity network;

upon receipt of the first data packet, storing in a gateway cache first transaction data associated with the first data packet;

in response to a determination, by the network server, that the first transaction data is not identical to transaction data already saved at the gateway cache, storing the transaction request in a queue;

upon receipt of the second data packet, storing in the gateway cache second transaction data associated with the second data packet;

in response to a determination, by the network server, that the second transaction data is identical to the first transaction data, deleting the second data packet;

upon a lapse of a pre-determined time period, validating all transaction requests included in data packets stored in the queue;

removing from the queue all data packets failing to validate and, in response to a failure to validate a transaction request, transmitting the transaction request back to a sender identified in a header of a data packet including the transaction request; and after the removing, transmitting the transaction requests stored in the queue to the entity application server associated with the entity network.

\* \* \* \* \*